2,447,552
Patented June 3, 1969

3,447,552
SEAWATER HYDRAULIC SYSTEM FOR DEEP SUBMERGENCE SALVAGE AND EXPLORATION VEHICLES
Joseph F. Grosson, Alexandria, Va., assignor to the United States of America as represented by the Secretary of the Navy
Filed Mar. 17, 1967, Ser. No. 624,674
Int. Cl. F16k 21/16; B63g 8/22
U.S. Cl. 137—81                                       8 Claims

ABSTRACT OF THE DISCLOSURE

A hydraulic power system using seawater as the fluid medium for use with deep submergence vehicles to power tools and manipulators wherein the environmental seawater is drawn into the system through a succession of filter stages, stored in a reservoir, and then pressurized by a reciprocating hydraulic motor pump powered by an electrically driven rotating pump. All electrical and moving mechanisms are contained within a pressure compensated chamber filled with a dielectric fluid.

---

The invention described herein may be manufactured and used by or for the Government of the United States of America for governmental purposes without the payment of an royalties thereon or therefor.

Background of the invention

This invention relates generally to power systems for actuating manipulators and tools attached to deep submergence vehicles, and more particularly to a hydraulic power system utilizing seawater as the fluid medium. Hydraulic and electrical power systems of various types are well known and have been used on deep submergence vehicles; however all are subject to the inherent problem of the seawater at tremendous pressures entering the electrical devices and the hydraulic systems causing failure or detrimental effect. Most hydraulic power systems use an oil or other fluid through which power is transmitted in the form of pressure to a plurality of tools and manipulators. The fluid used in prior art systems is generally not the same as the environmental fluid and any leaks into the system have detrimental effect. This invention utilizes the environmental fluid as its hydraulic fluid and therefore eliminates most problems which arise when the environmental fluid leaks into the hydraulic pressure system.

Another problem which has plagued hydraulic or electrical power systems for deep submergence vehicles is the ingress of water to damage electrical components. Moisture proof and submersible electrical pumps have not proved entirely satisfactory for application upon deep submerged vehicles where pressures are exceedingly high.

Operation of deep submergence salvage and exploration vehicles at extreme depths is attended with many problems, one of which is the extreme pressures of the sea. When it is recognized that these vehicles operate at depths where the water pressure is extremely high the problems are obvious. Any power system used to operate manipulators, tools, and other actuators must be designed to operate at high ambient pressures and to be impervious to water as leaks occur readily when the differential pressure is great. Workers in this field have not been able to attain these ends by the use of encapsulated motors, or by the use of "water-tight" high pressure hydraulic oil power systems. Using the environmental fluid at its ambient pressure or above, as contemplated by this invention, eliminates most of the disadvantages of the prior art. It can be seen that any leaks into this novel system will not contaminate the hydraulic fluid, and if a positive pressure compared to the ambient is maintained in the system, few if any leaks will occur at all.

Accordingly, a primary object of this invention is to utilize the environmental seawater as the hydraulic fluid in a deep submergence salvage and exploration vehicle power system.

Another object is to house all the electrical components, valves, motors, and pumps within a chamber filled with a dielectric fluid maintained at a pressure above ambient.

An overall object of this invention is to provide an efficient, trouble-free power system for actuating manipulators and tools in connection with deep submergence salvage and exploration vehicles.

Other objects and features of the invention will become apparent to those skilled in the art as the disclosure is made in the following detailed description of the preferred embodiment of the invention as illustrated in the accompanying sheet of drawings in which:

Description of the preferred embodiment

Figure 1:
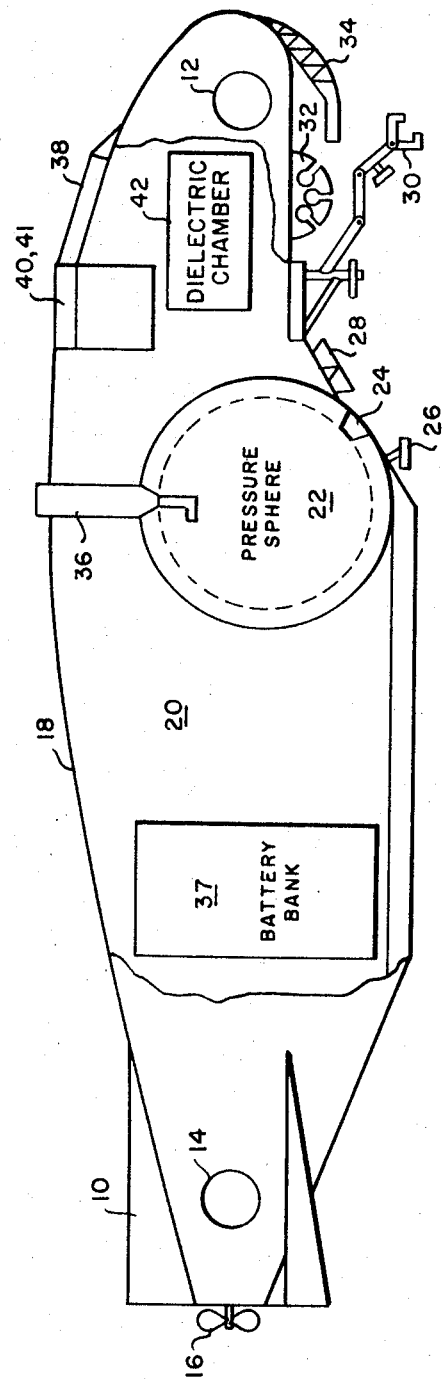
FIG. 1 is an outline elevation view of a deep submergence salvage and exploration vehicle.

Referring now to the drawings, wherein like reference characters designate like or corresponding parts throughout the several views, there is shown in FIG. 1 a deep submergence salvage and exploration vehicle. A typical vehicle may be shaped similar to a submarine and may have stern planes 10 for steering control, bow thrusters 12, and stern thrusters 14, also for steering control. Aft of these stern planes 10 there is located one or more propellers 16 which are mechanically connected to the main propulsion motors, as is well known in the art. The exterior hull 18 need not be watertight to exclude seawater at the tremendous pressures involved when carrying on salvage and exploration at extreme depths, and therefore the interior portion of the vehicle 20 may be maintained at ambient pressures. Within the main hull 18 there is contained a pressure capsule 22 in the form of a sphere for containing the crew. This capsule is maintained at normal atmospheric pressure to provide a habitable environment. An observation port 24 is provided in the lower forward portion of the pressure capsule to permit visual monitoring of operations. For remote observation, television cameras 26 are also provided as well as flood lights 28 for illumination. A manipulator arm 30, suitably controlled from within the pressure capsule by a valve manifold (not shown), is attached to the vehicle within sight of the TV cameras and the observation port and may be articulated to seize tools from the tool rack 32 and then to move them into position to perform work associated with salvage and exploration. Any specimen seized by the manipulator or the tool which it holds may be placed in the basket 34 by articulating the manipulator 30 into the basket. A periscope 36 communicating with the pressure capsule is also provided to observe the environment during movement of the vehicle.

The main hull 18 may also contain a plurality of battery banks 37 (one of which is shown) to provide main propulsion power and auxiliary power. On the forward section of the main hull 18 are mounted the seawater inlet to the hydraulic system 38 which contains a successive series of filters. Also the seawater reservoirs 40 and 41 are mounted in the forward portion of the hull. The seawater inlet communicates with the outside environment for the purpose of obtaining water for the system, and a spring-biased piston of a pressure reservoir also communicates with the outside environment so as to add the ambient pressure to the system. Within any portion of the hull, but preferably forward, there is mounted a dielectric chamber 42 containing the valves, pumps, and other electrical equipment.

Figure 2:
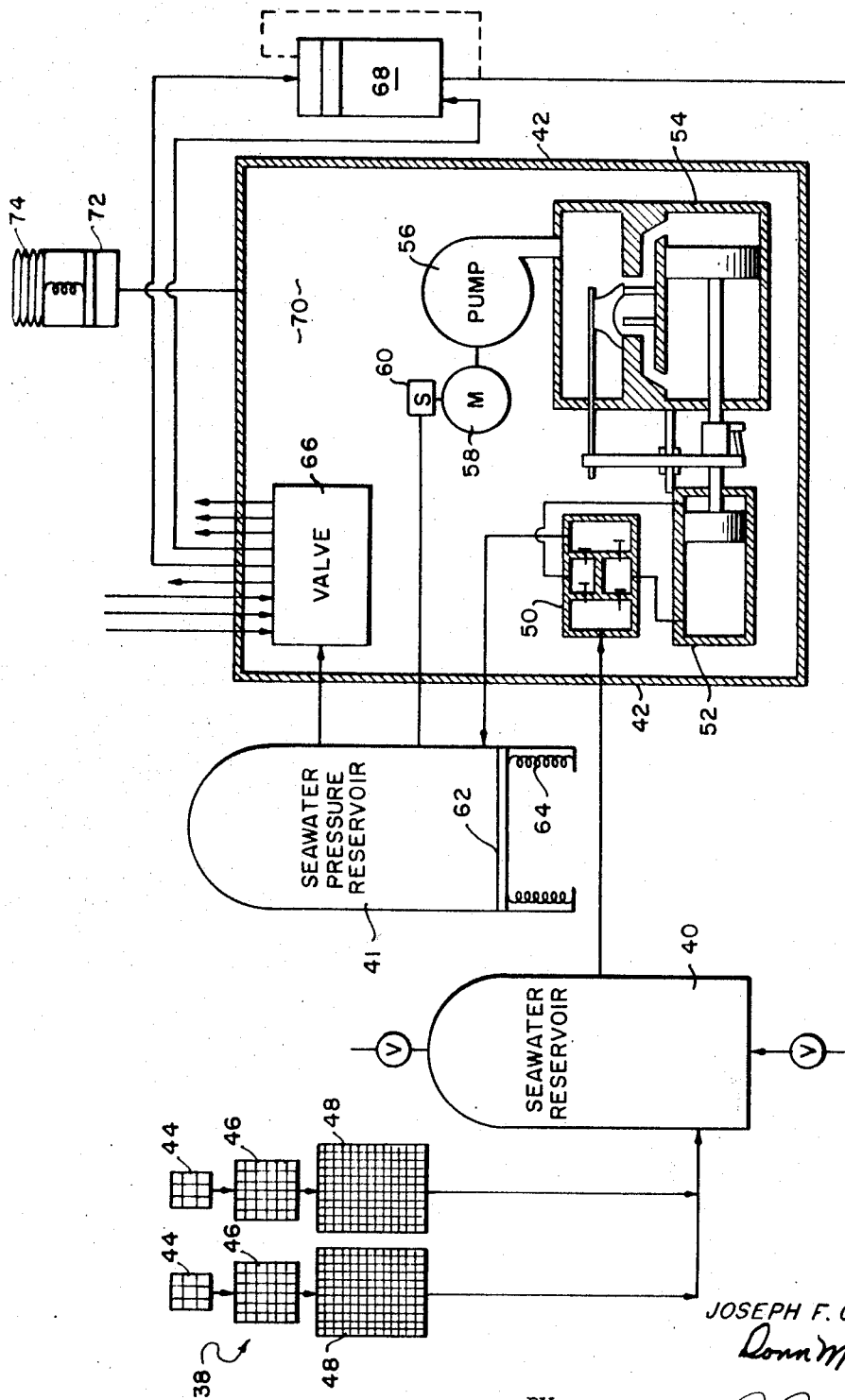
FIG. 2 is a schematic diagram of a seawater hydraulic system.

Referring now to FIG. 2, there is shown the specific details of the novel seawater hydraulic system. The seawater inlet 38 consists of successive stages of filters wherein a large screen filter element 44 is in direct contact with the environmental sea and communicates with the medium screen filter 46 which thence communicates with the fine screen filter 48 from which filtered water may be fed into the seawater reservoir 40 free of any debris or sealife. Because the filters are arranged from large at the sea entrance to small at the input to the system, they may be back-flushed to clean out the debris as is well known in the art. The function of the seawater reservoir 40 is merely to store filtered water at ambient pressure. Filtered water is drawn from this reservoir into the valve compartment 50 which contains a number of one-way check valves and is associated with the water pump end of a reciprocating motor and pump 52. Water, at increased pressure, is then conveyed from the outlet of the water pump to the valve compartment 50 through the proper one-way check valves as is well known in the art, and thence conveyed to the sea water pressure reservoir 41, where the water is stored for subsequent use to operate tools and manipulators in the system.

The double-acting reciprocating water pump comprises a piston which is mechanically driven by a reciprocating hydraulic motor 54. The hydraulic motor contains a piston whose direction of travel is controlled by a slide valve arrangement. As can be seen in FIG. 2, the piston in the hydraulic motor is larger than the piston in the water pump and therefore a smaller amount of pressure in the hydraulic motor will pump water at a higher pressure in the water pump. Further discussion of the operation of this pump is not required as these reciprocating pumps are well known in the art. The operating fluid in the hydraulic motor of the reciprocating pump may be any type of hydraulic fluid, well known in the art, but a silicone fluid having dielectric properties is preferred. Supplying hydraulic fluid to the slide valve compartment of the reciprocating hydraulic motor is a rotary pump 56 driven mechanically by an electric motor 58. Hydraulic fluid is supplied to rotary pump 56 directly from within the dielectric fluid chamber 42. The operation of the entire pumping system is controlled by a pressure-sensing switch 60 which senses the pressure in the seawater pressure reservoir 41.

As previously described, the seawater pressure reservoir 41 is maintained at operating pressure by providing it with a reciprocating piston or bellows arrangement 62, a side of which communicates with the seawater environment and which is biased by springs 64. Water at operating pressures is thence conducted to the manifold valve arrangement 66 contained within the dielectric fluid chamber 42 for distribution to actuators, manipulators, and tools arranged on the deep submergence salvage and exporation vehicle as described earlier. These valves within the manifold are electrically controlled valves such as the solenoid type. Control of the electrical signal to the valves is accomplished on an operating console (not shown) within the crew's pressure capsule. When a valve is electrically actuated by the crew, seawater at operating pressure is provided to the inlet side of an actuator 68, which may be of a piston type. The exhaust side of the actuator cylinder (containing filtered water from a previous reversed stroke) may be exhausted to the environment or returned directly to the seawater reservoir 40 which is maintained at ambient pressure.

The dielectric fluid chamber 42 is completely filled with a dielectric fluid, previously described, and is maintained at a pressure slightly above the ambient by the action of a spring-biased piston and bellows arrangement 72 and 74 respectively. The piston chamber and the bellows chamber are completely filled with the dielectric fluid 70, and the bellows transmit the ambient environmental pressure to the spring-biased side of a piston. The side of the piston opposite the spring and the bellows arrangement communicates directly with the dielectric fluid chamber 42. As it can be readily seen, the ambient pressure and the spring pressure are added together and thereby maintain the dielectric chamber at a pressure somewhat above ambient. This arrangement results in the dielectric chamber 42 being completely filled with dielectric fluid 70 and being free from the possibility of ingress of the outside environmental seawater and thereby protecting all the electrical and mechanical elements from the hostile sea. All fluid pipes and electrical cables that penetrate the wall of the dielectric fluid chamber are watertight feed-through couplings.

*Operation of the seawater hydraulic system*

Seawater from the environment is allowed to pass the successive stages of filtration 38 into the reservoir 40 during the vehicle's descent from the surface to the operating level. Filtered water is then fed to the reciprocating water pump system consisting of the elements 50, 52, 54, 56 and 58 where the pressure is increased to an approximate range of 200 to 2,000 p.s.i. above the ambient pressure. The water is then supplied to the seawater pressure reservoir 41 where it is stored at this differential pressure. This water at operating pressure is available to the manifold valve arrangement 66 where each valve is electrically controlled signals from the operating console in the crew's pressure capsule. When one of the valves is actuated, pressure is distributed to one of the actuators such as 68, which causes the actuator piston to be driven downward or upward (as viewed in FIG. 2) depending on which valve is actuated, so as to open or close a grab or operate a tool. The exhaust side of the actuator, which depends on the direction of travel, is exhausted to the environmental sea or is returned to the seawater reservoir 40 for future use. All electrical and moving mechanical elements which might be detrimentally affected by seawater are contained within a dielectric fluid chamber 42. The rotary and reciprocating hydraulic motor portion of the pumping system obtains its operating fluid from within the chamber and exhausts it after use back into the chamber. The pumping system is called into operation by the action of a pressure-sensing switch 60 which senses a reduction in pressure in the seawater pressure reservoir 41.

As can be seen from the above disclosure this novel seawater hydraulic system when used in conjunction with a deep submergence salvage and exporation vehicle has the advantages of providing a substantially leak-free system and uses the environmental seawater as its pressure medium for operating actuators, tools, and manipulators, and therefore any leaks which may occur will not contaminate the system.

What is claimed is:
1. A hydraulic power system for deep submergence vehicles using seawater as the hydraulic fluid comprising:
    a filter section, the input side of which is in fluid communication with the environmental seawater;
    a seawater reservoir;
    a fluid conduit connecting the output side of said filter section with said seawater reservoir;
    a water pump having an inlet and output;
    a second fluid conduit connecting the inlet of said water pump and said seawater reservoir;
    a pressure reservoir;
    a third fluid conduit connecting the output of said water pump to said pressure reservoir;
    a valve manifold for controlling various manipulators associated with the deep submergence vehicle;
    a fourth fluid conduit connecting said pressure reservoir with said valve manifold; and
    a closed-fluid chamber filled with a hydraulic fluid and containing said pump, and valve manifold.

2. The device of claim 1, wherein the filter section is a plurality of filtration stages connected in series, and where the largest size is in contact with the environmental seawater.

3. The device of claim 1 wherein the filter section is a series of screens progressing in size from large to small in a direction toward said seawater reservoir.

4. The device of claim 1, wherein the water pump is a double-acting reciprocating, hydraulic oil driven pump.

5. The device of claim 4, wherein the hydraulic oil drive pump obtains and exhausts its operating oil from the closed fluid chamber.

6. The device of claim 1, wherein the closed fluid chamber has means for pressure and volume compensation.

7. The device of claim 6 wherein the means for pressure and volume compensation is a spring biased piston and bellows arrangement in contact with the environment.

8. The device of claim 1 wherein the pressure reservoir contains a piston one side of which is in contact with the ambient pressure and which is spring biased inwardly so that the pressure within said pressure reservoir is equal to the ambient pressure plus the spring bias pressure.

References Cited

UNITED STATES PATENTS

| 2,372,347 | 3/1945 | Watson | 114—51 |
| 3,003,448 | 10/1961 | Gay | 114—16 |
| 3,163,985 | 1/1965 | Bouyoucos | 60—51 |

WILLIAM F. O'DEA, *Primary Examiner.*

RICHARD GERARD, *Assistant Examiner.*

U.S. Cl. X.R.

60—1, 36, 51; 61—69; 114—16